United States Patent
Kim et al.

(10) Patent No.: US 8,068,685 B2
(45) Date of Patent: Nov. 29, 2011

(54) METHOD FOR RESIZING IMAGES USING INTEGER DCT COEFFICIENTS

(75) Inventors: Won Ha Kim, Gyeonggi-do (KR); Hyung Suk Oh, Gyeonggi-do (KR)

(73) Assignee: University-Industry Cooperation Group of Kyung Hee University, Gyeonggi-Do (KR)

( * ) Notice: Subject to any disclaimer, the term of this patent is extended or adjusted under 35 U.S.C. 154(b) by 975 days.

(21) Appl. No.: 12/021,512

(22) Filed: Jan. 29, 2008

(65) Prior Publication Data

US 2008/0181521 A1    Jul. 31, 2008

(30) Foreign Application Priority Data

Jan. 29, 2007    (KR) ................. 10-2007-0009066

(51) Int. Cl.
    *G06K 9/36*    (2006.01)
(52) U.S. Cl. ......... 382/250; 382/233; 382/248; 382/298
(58) Field of Classification Search .................. 382/250, 382/233, 248, 298
    See application file for complete search history.

(56) References Cited

U.S. PATENT DOCUMENTS

2004/0126021 A1* 7/2004 Sull et al. ............... 382/233

* cited by examiner

*Primary Examiner* — Samir Ahmed
*Assistant Examiner* — Ruiping Li
(74) *Attorney, Agent, or Firm* — Occhiuti Rohlicek & Tsao LLP

(57) ABSTRACT

The present invention relates to a method of converting the size of an image, i.e., resolution of an image, and more specifically, to a method of reducing or enlarging the size of an image using coefficients of integer discrete cosine transform (Integer DCT), which is a type of block transform. Since the method of reducing and enlarging the size of an image according to the present invention reduces or enlarges the size of an image through an integer operation, hardware can be implemented using shifts and additions, and therefore, complexity of the hardware may be lowered, and the method of the present invention provides images of a good quality that is almost the same as the quality of an image provided according to a conventional method of reducing and enlarging an image using real-number DCT coefficients. The method of reducing and enlarging the size of an image according to the present invention is compatible with a H.264/AVC codec.

9 Claims, 11 Drawing Sheets

FIG. 3
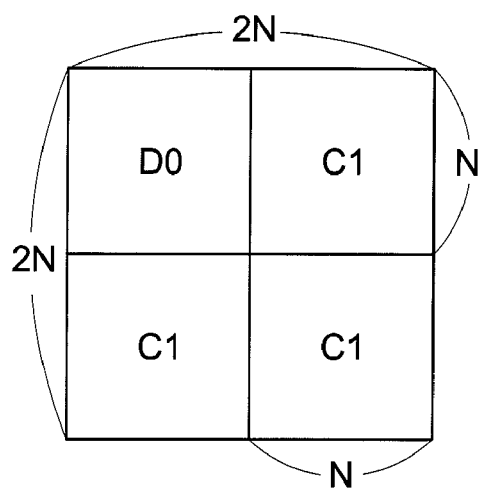
(a)
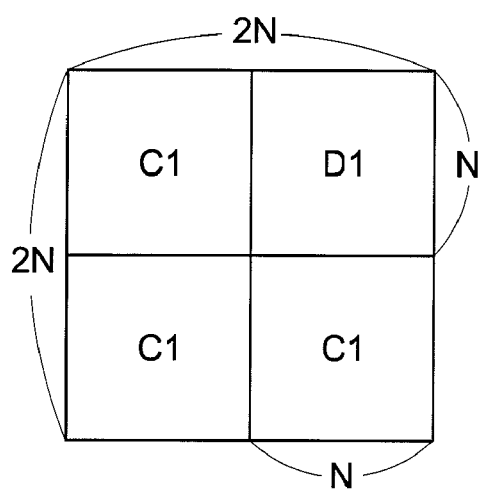
(b)
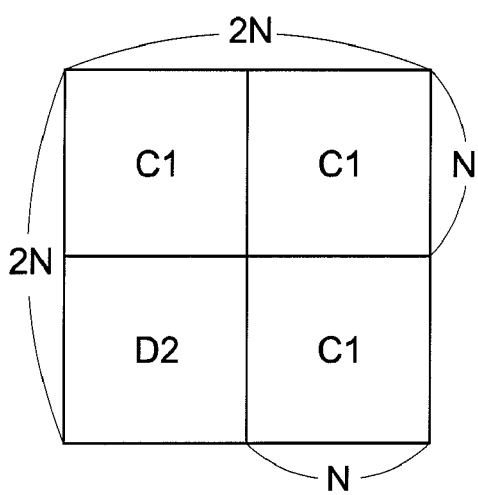
(c)
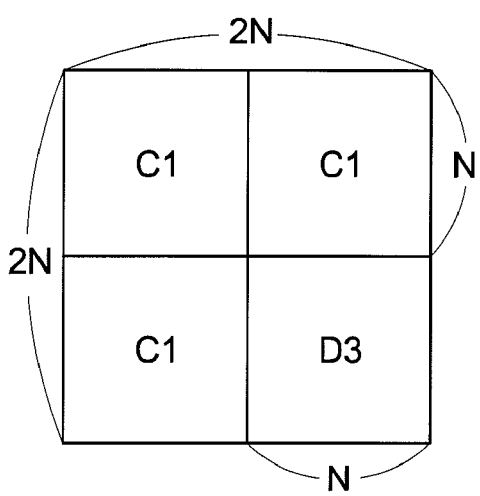
(d)

(a)  (b)

METHOD FOR RESIZING IMAGES USING INTEGER DCT COEFFICIENTS

CROSS-REFERENCE TO RELATED PATENT APPLICATIONS

This application claims the benefits of Korean Patent Application No. 10-2007-0009066 filed on Jan. 29, 2007 in the Korean Intellectual Property Office, the disclosures of which are incorporated herein in their entirety by reference.

BACKGROUND OF THE INVENTION

1. Field of the Invention

The present invention relates to a method of converting the size of an image, i.e., resolution of an image, and more specifically, to a method of reducing or enlarging the size of an image using integer discrete cosine transform (Integer DCT) coefficients.

2. Background of the Related Art

Different communication networks are merged with one another in the present communication environments using broadband convergence networks (BcN), i.e., core networks capable of providing services such as connection of wired and wireless communications, merger of broadcasting and communication networks, IP convergence using IP networks, and the like, and such a trend will be further accelerated in the future. Along with the trend of digital convergence in heterogeneous communication network environments, researches on universal media communications are actively in progress recently. Since the types of multimedia terminals used in a variety of communication networks are more and more diversified, techniques for converting the size of an image are developed in various ways to reasonably harmonize different networks and different multimedia terminals with one another.

Among the techniques for converting the size of an image, a method using real-number discrete cosine transform (DCT) coefficients shows superior performance. Since the real-number DCT coefficients are used in conversion techniques employing a moving picture codec such as MPEG-1, MPEG-2, MPEG-4, H.261, H.263, or H.26L, the techniques using the real-number DCT coefficients are advantageously compatible with existing moving picture codecs.

However, there is a problem in that conventional techniques for converting the size of an image using real-number DCT coefficients cannot be applied, as it is, to a H.264/AVC codec that generates integer DCT coefficients using an integer discrete cosine transform (integer DCT) technique in a transforming procedure of the codec. Furthermore, since conventional techniques for converting the size of an image using real-number DCT coefficients perform real-number operations, complexity is so high in manufacturing hardware that they are not easy to implement.

SUMMARY OF THE INVENTION

Accordingly, the present invention has been made in view of the above problems, and it is an object of the present invention to provide a method of reducing and enlarging the size of an image using integer DCT coefficients.

To accomplish the above object, according to one aspect of the present invention, there is provided a method of reducing the size of an image, the method comprising the steps of: partitioning an inputted 2N×2N integer DCT coefficient block I1 into N×N integer DCT coefficient blocks B0, B1, B2, and B3 and approximation-inverse-DCT-transforming the partitioned N×N integer DCT coefficient blocks into N×N image blocks D0, D1, D2, and D3 of a spatial domain through N×N approximation-DCT-transform; creating 2N×2N image blocks P0, P1, P2, and P3 by inserting 0's together with the respective approximation-inverse-DCT-transformed N×N image blocks D0, D1, D2, and D3 and approximation-DCT-transforming the created 2N×2N image blocks P0, P1, P2, and P3 into 2N×2N approximation DCT coefficient blocks Q0, Q1, Q2, and Q3; creating an combined approximation coefficient block Y0 by summing the 2N×2N approximation DCT coefficient blocks Q0, Q1, Q2, and Q3 and down-sampling an N×N approximation DCT coefficient block Y1 of a low frequency component from the created combined approximation coefficient block Y0; separating a post scaling factor PF of the down-sampled N×N approximation DCT coefficient block Y1 from the down-sampled N×N approximation DCT coefficient block Y1; and transforming portions excluding the post scaling factor PF separated from the down-sampled N×N approximation DCT coefficient block Y1 into an N×N integer DCT coefficient block O3.

To accomplish the above object, according to another aspect of the present invention, there is provided a method of enlarging the size of an image, the method comprising the steps of: transforming an inputted N×N integer DCT coefficient block I2 into N×N approximation DCT coefficient block A1 by element-by-element multiplying the inputted N×N integer DCT coefficient block I2 and a post scaling factor of the inputted N×N integer DCT coefficient block I2; up-sampling the N×N approximation DCT coefficient block A1 into a 2N×2N approximation DCT coefficient block A2 by inserting 0's together with the N×N approximation DCT coefficient block A1 and approximation-inverse-DCT-transforming the up-sampled 2N×2N approximation DCT coefficient block A2 into a 2N×2N image block A3 of a spatial domain; partitioning the 2N×2N image block A3 into four N×N image blocks W0, W1, W2, and W3 and creating four N×N approximation DCT coefficient blocks V0, V1, V2, and V3 by approximation-DCT-transforming the respective partitioned N×N image blocks; separating post scaling factors PFs of the four created N×N approximation DCT coefficient blocks V0, V1, V2, and V3 from the N×N approximation DCT coefficient blocks V0, V1, V2, and V3; transforming portions excluding the post-adjustment factors PFs separated from the four N×N approximation DCT coefficient blocks V0, V1, V2, and V3 into N×N integer DCT coefficient blocks U0, U1, U2, and U3 respectively; and transforming the transformed four N×N integer DCT coefficient blocks U0, U1, U2, and U3 into a 2N×2N integer DCT coefficient block T3 by summing the N×N integer DCT coefficient blocks U0, U1, U2, and U3.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 3 is a view showing an example of a 2N×2N image block created by inserting 0's;

DETAILED DESCRIPTION OF THE PREFERRED EMBODIMENT

Hereinafter, a method of reducing and a method of enlarging the size of an image according to embodiments of the present invention will be described in detail with reference to the accompanying drawings.

Figure 1:
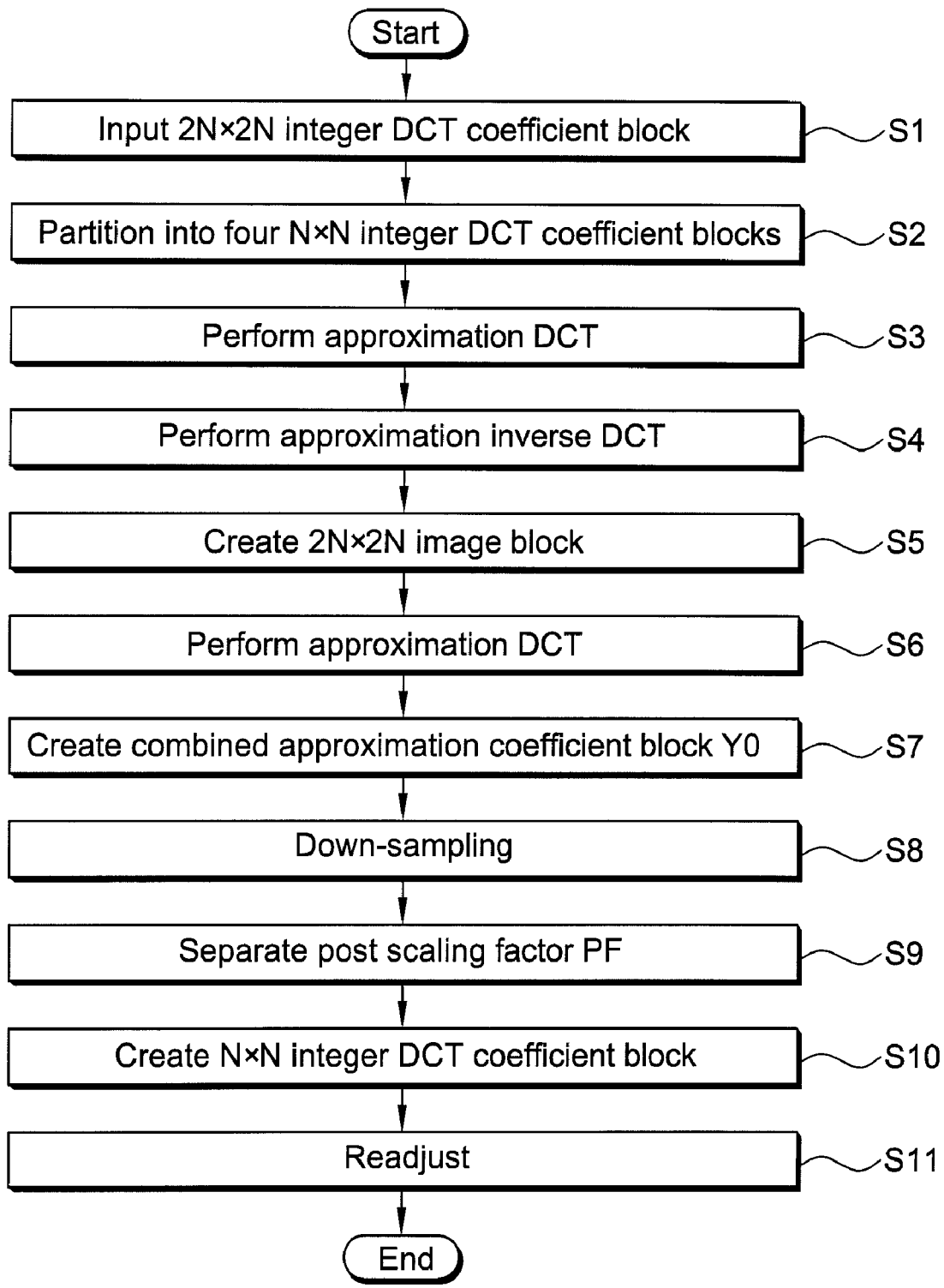
FIG. 1 is a flowchart illustrating a method of reducing the size of an image according to an embodiment of the present invention.

FIG. 1 is a flowchart illustrating a method of reducing the size of an image according to an embodiment of the present invention.

Referring to FIG. 1, an integer DCT coefficient block (I1) having a size of 2N×2N is inputted (step 1). Pixel values configuring an image frame are divided into image pixel blocks respectively having a size of N×N, and integer DCT is performed on each of the image pixel blocks in a conventional block unit transform procedure. As a result, four N×N integer DCT coefficient blocks are created from four adjacent N×N image pixel blocks of the image frame. In this step, a 2N×2N integer DCT coefficient block I1 comprising the four N×N integer DCT coefficient blocks created as such is inputted.

Figure 2:
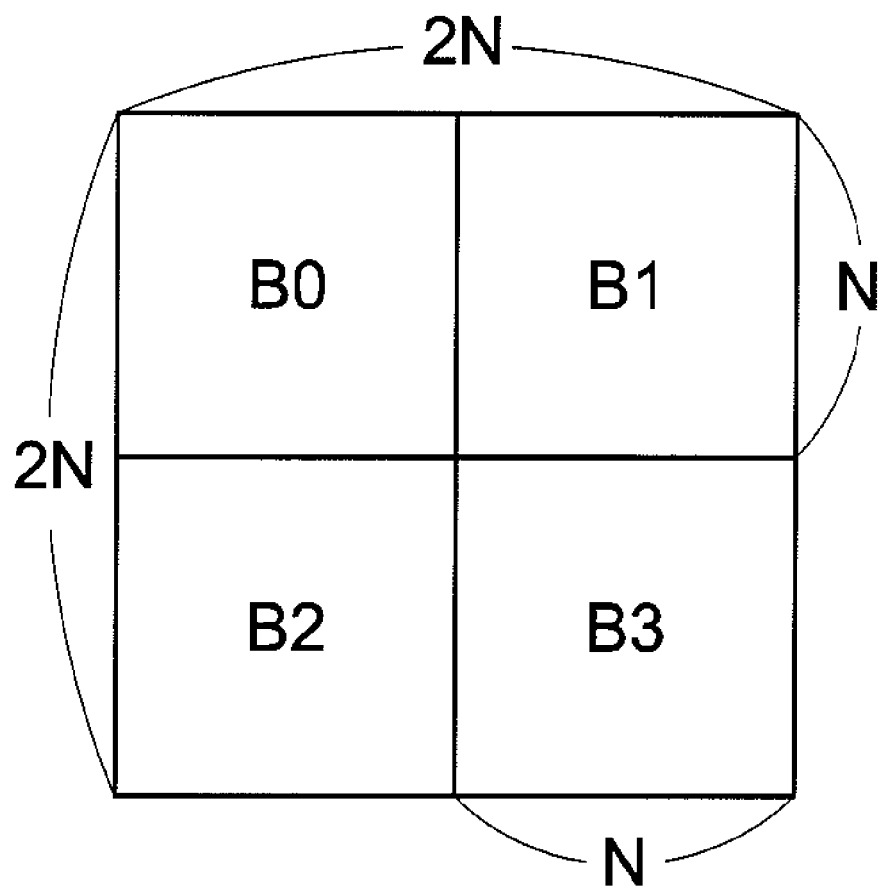
FIG. 2 is a view showing an example of an inputted 2N×2N integer DCT coefficient block.

Then, the inputted 2N×2N integer DCT coefficient block I1 is partitioned into four N×N integer DCT coefficient blocks (step 2). Referring to FIG. 2 showing an example of the inputted 2N×2N integer DCT coefficient block, four N×N integer DCT coefficient blocks forming the 2N×2N integer DCT coefficient block I1 includes block B0 positioning at the upper left side, block B1 positioning at the upper right side, block B2 positioning at the lower left side, and block B3 positioning at the lower right side.

The four N×N integer DCT coefficient blocks B0, B1, B2, and B3 partitioned from the 2N×2N integer DCT coefficient block I1 are respectively element-by-element multiplied by a post scaling factor PF and transformed into four N×N approximation DCT coefficient blocks C0, C1, C2, and C3 (step 3). Hereinafter, the operator ⊗ denotes element-by-element multiplication of matrices, and if two matrices A and PF are respectively A={$a_{i,j}$} and PF={$PF_{i,j}$}, it is calculated such that A ⊗ PF={$a_{i,j} \cdot PF_{i,j}$}.

As an example of the post scaling factor PF multiplied to the four N×N integer DCT coefficient blocks B0, B1, B2, and B3, a PF multiplied to a 4×4 integer DCT coefficient block of H.264/AVC is as shown in Equation 3.

$$PF = \begin{bmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{bmatrix} \quad \text{[Equation 1]}$$

Here, $$a = \frac{1}{2}, b = \sqrt{\frac{2}{5}}.$$

The four N×N approximation DCT coefficient blocks C0, C1, C2, and C3 are respectively approximation inverse-DCT-transformed to create N×N image blocks D0, D1, D2, and D3 of the spatial domain (step 4). The N×N image blocks D0, D1, D2, and D3 of the space domain are respectively created as shown in Equation 2.

$$D0 = (T_{N \times N}^{DA})^t \cdot C0 \cdot T_{N \times N}^{DA}$$
$$D1 = (T_{N \times N}^{DA})^t \cdot C1 \cdot T_{N \times N}^{DA}$$
$$D2 = (T_{N \times N}^{DA})^t \cdot C2 \cdot T_{N \times N}^{DA}$$
$$D3 = (T_{N \times N}^{DA})^t \cdot C3 \cdot T_{N \times N}^{DA} \quad \text{[Equation 2]}$$

As an example, 4×4 approximation DCT of H.264/AVC is as shown Equation 3.

$$T_{4 \times 4}^{DA} = \begin{bmatrix} a & a & a & a \\ b & c & -c & -b \\ a & -a & -a & a \\ c & -b & b & -c \end{bmatrix} \quad \text{[Equation 3]}$$

Here, $$a = \frac{1}{2}, b = \sqrt{\frac{2}{5}}, c = \sqrt{\frac{1}{10}}.$$

2N×2N image blocks P0, P1, P2, and P3 are created by inserting 0's together with the created N×N image blocks D0, D1, D2, and D3 of the space domain (step 5). Referring to FIG. 3, a 2N×2N image block P0 is created by positioning an N×N image block D0 of the spatial domain at the upper left side and inserting an N×N image block C1 having elements of all 0's in the other portions of the 2N×2N image block. Another 2N×2N image block P1 is created by positioning an N×N image block D1 of the spatial domain at the upper right side and inserting an N×N image block C1 having elements of all 0's in the other portions of the 2N×2N image block. Another 2N×2N image block P2 is created by positioning an N×N image block D2 of the spatial domain at the lower left side and inserting an N×N image block C1 having elements of all 0's in the other portions of the 2N×2N image block. Another 2N×2N image block P3 is created by positioning an N×N image block D3 of the spatial domain at the lower right side and inserting an N×N image block C1 having elements of all 0's in the other portions of the 2N×2N image block.

The created 2N×2N image blocks P0, P1, P2, and P3 are respectively approximation-DCT-transformed to create 2N×2N approximation DCT coefficient blocks Q0, Q1, Q2, and Q3 (step 6). The 2N×2N approximation DCT coefficient blocks Q0, Q1, Q2, and Q3 are respectively created as shown in Equation 4.

$$Q0 = T_{2N \times 2N}^{DA} \cdot P0 \cdot (T_{2N \times 2N}^{DA})^t$$

$$Q1 = T_{2N \times 2N}^{DA} \cdot P01 (T_{2N \times 2N}^{DA})^t$$

$$Q2 = T_{2N \times 2N}^{DA} \cdot P2 \cdot (T_{2N \times 2N}^{DA})^t$$

$$Q3 = T_{2N \times 2N}^{DA} \cdot P3 \cdot (T_{2N \times 2N}^{DA})^t \quad \text{[Equation 4]}$$

As an example, if N=4, 8×8 approximation DCT of H.264/AVC is as shown Equation 5.

$$T_{8\times 8}^{DA} = \begin{bmatrix} a & a & a & a & a & a & a & a \\ b & d & e & g & -g & -e & -d & -b \\ c & f & -f & -c & -c & -f & f & c \\ d & -g & -b & -e & e & b & g & -d \\ a & -a & -a & a & a & -a & -a & a \\ e & -b & g & d & -d & -g & b & -e \\ f & -c & c & -f & -f & c & -c & f \\ g & -e & d & -b & b & -d & e & -g \end{bmatrix} \quad \text{[Equation 5]}$$

Here, $$a = \frac{1}{2\sqrt{2}}, b = \frac{12}{17\sqrt{2}}, c = \frac{1}{\sqrt{5}}, d = \frac{10}{17\sqrt{2}},$$

$$e = \frac{6}{17\sqrt{2}}, f = \sqrt{\frac{1}{20}}, g = \frac{3}{17\sqrt{2}}$$

Figure 4:
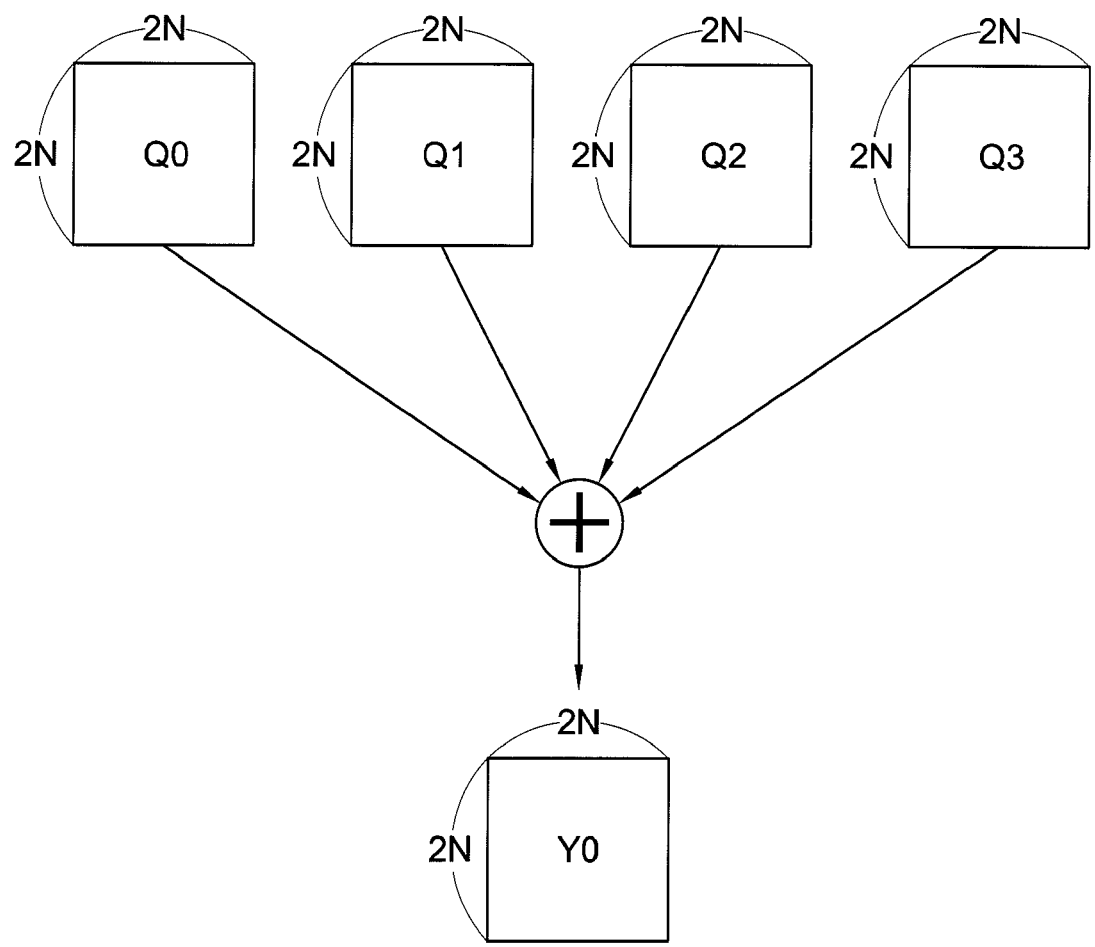
FIG. 4 is a view schematically showing a process of creating a 2N×2N combined approximation block.

An combined approximation block Y0 is created by summing the created 2N×2N approximation DCT coefficient blocks Q0, Q1, Q2, and Q3 (step 7). Referring to FIG. 4, one 2N×2N combined approximation block Y0 is created by element-by-element summing the 2N×2N approximation DCT coefficient blocks Q0, Q1, Q2, and Q3.

Figure 5:
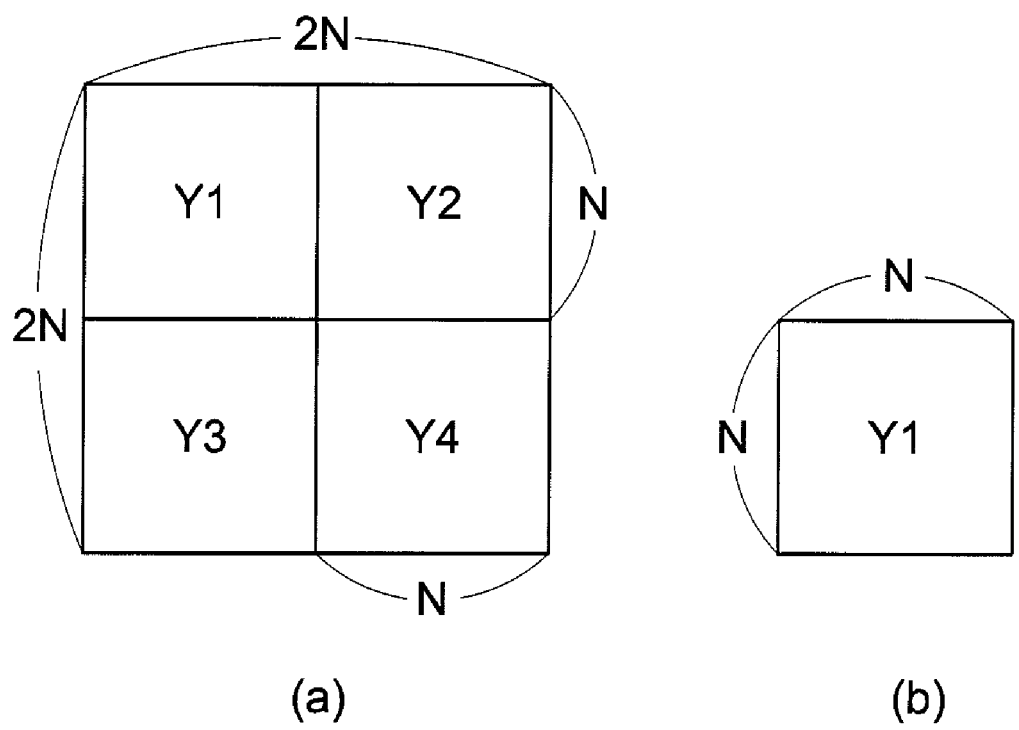
FIG. 5(a) is a view showing an example of a 2N×2N combined approximation block.
FIG. 5(b) is a view showing an example of a down-sampled N×N approximation DCT coefficient block.

An N×N approximation DCT coefficient block Y1 is created by down-sampling the created combined approximation block Y0 (step 8). FIG. 5(a) shows the created 2N×2N combined approximation block Y0. The 2N×2N combined approximation block Y0 comprises four N×N approximation DCT coefficient blocks Y1, Y2, Y3, and Y4. As an embodiment, if an image pixel block of the spatial domain is DCT-transformed, low frequency components of image spectrum have a characteristic of mainly concentrating on the upper left side of a DCT-transformed block. Accordingly, as shown in FIG. 5(b), only the N×N approximation DCT coefficient block Y1 positioning at the upper left side is down-sampled among the four N×N approximation DCT coefficient blocks Y1, Y2, Y3, and Y4 configuring the 2N×2N combined approximation block Y0.

Figure 6:
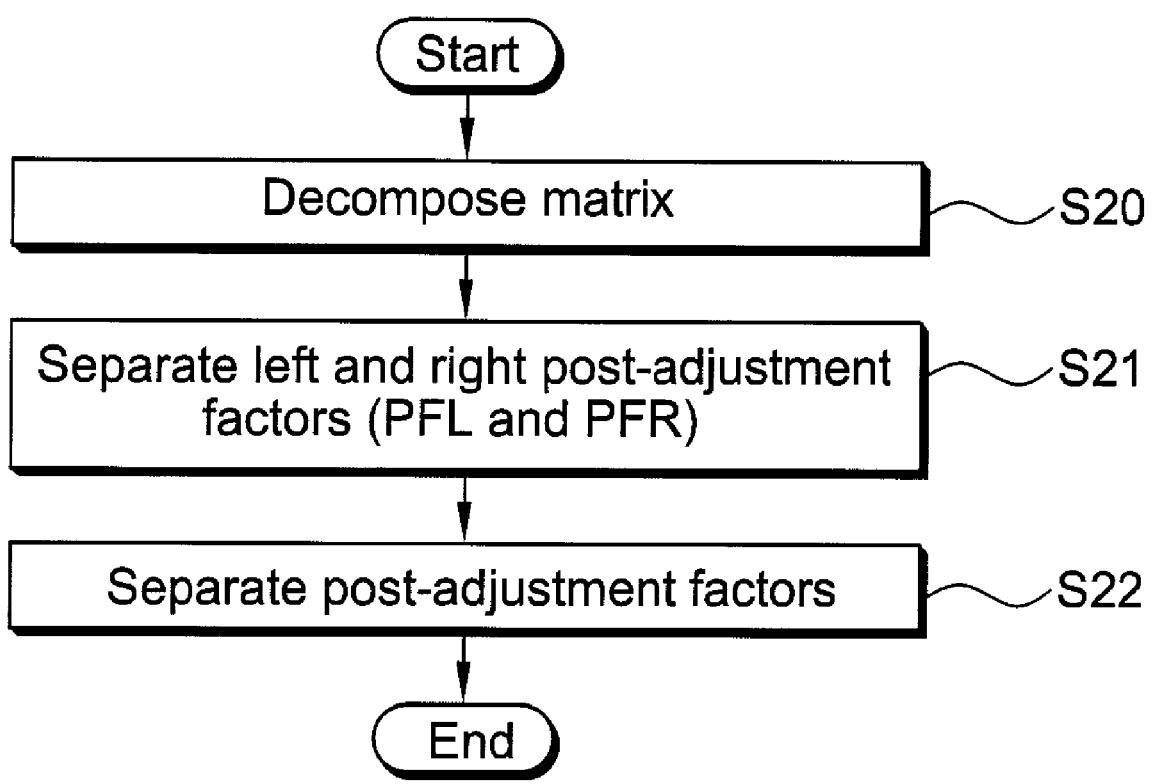
FIG. 6 is a flowchart further specifically illustrating the step of separating a post scaling factor (PF) from a down-sampled N×N combined approximation block.

A post scaling factor PF is separated from the down-sampled N×N approximation DCT coefficient block Y1 (step 9). FIG. 6 is a flowchart further specifically illustrating step 9.

Referring to FIG. 6, as shown in Equation 6, the down-sampled N×N approximation DCT coefficient block Y1 is decomposed into the form of a multiplication of the 2N×2N combined approximation block Y0, a matrix L0 multiplied to the left side of the 2N×2N combined approximation block Y0, and a matrix R0 multiplied to the right side of the 2N×2N combined approximation block Y0 (step 20).

$$Y1 = L0 \cdot Y0 \cdot R0 \quad \text{[Equation 6]}$$

As shown in Equation 7, the 2N×2N combined approximation block Y0 is decomposed once more in the form of a multiplication of the inputted 2N×2N integer DCT coefficient block I1, a left side post scaling factor matrix PFL multiplied to the left side of the 2N×2N integer DCT coefficient block I1, and a right side post-adjustment factor matrix PFR multiplied to the right side of the 2N×2N integer DCT coefficient block I1 (step 21).

$$Y0 = PFL \cdot I1 \cdot PFR \quad \text{[Equation 7]}$$

The post scaling factor PF of the down-sampled N×N approximation DCT coefficient block Y1 is separated by putting the combined approximation coefficient block Y0 decomposed in Equation 7 into the down-sampled N×N approximation DCT coefficient block Y1 decomposed in Equation 6 (step 22).

As shown in Equation 8, from the created matrices L0, R0, PFL, and PFR, one integrated matrix L1 is created by multiplying the left side matrix PFL and matrix L0, and one integrated matrix R1 is created by multiplying the right side matrix PFR and matrix R0.

$$Y1 = L1 \cdot I1 \cdot R1 \quad \text{[Equation 8]}$$

As shown in Equation 9, matrix L1 is decomposed into a multiplication of the left side post scaling factor matrix PFL and matrix L2 in the form of multiplying the left side post scaling factor matrix PFL to the left side, and matrix R1 is decomposed into matrix R2 and a multiplication of the right side post scaling factor matrix PFR in the form of multiplying the right side post scaling factor matrix PFR to the right side.

$$Y1 = PFL \cdot L2 \cdot I1 \cdot R2 \cdot PFR \quad \text{[Equation 9]}$$

As shown in Equation 10, the post scaling factor PF is separated by integrating the left side post scaling factor PFL and the right side post scaling factor PFR from matrices PFL, PFR, L2, R2, and L1, and the separated post scaling factor PF and the other matrices L2, R2, and I1 are decomposed as an element-by-element multiplication.

$$Y1 = (L2 \cdot I1 \cdot R2) \otimes PF \quad \text{[Equation 10]}$$

As an example, in the case of 4×4 integer DCT used for H.264/AVC, L2, R2, and PF are as shown Equations 11 to 13.

$$L2 = \begin{bmatrix} d_{00} & 0 & 0 & 0 & d_{00} & 0 & 0 & 0 \\ d_{00} & d_{11} & d_{12} & d_{13} & -d_{10} & d_{11} & -d_{12} & d_{13} \\ 0 & d_{21} & 0 & 0 & 0 & -d_{21} & 0 & 0 \\ d_{30} & d_{31} & d_{32} & d33 & -d_{10} & d_{31} & -d_{32} & d_{33} \end{bmatrix} \quad \text{[Equation 11]}$$

$$R2 = \begin{bmatrix} d_{00} & 0 & 0 & 0 & d_{00} & 0 & 0 & 0 \\ d_{00} & d_{11} & d_{12} & d_{13} & -d_{10} & d_{11} & -d_{12} & d_{13} \\ 0 & d_{21} & 0 & 0 & 0 & -d_{21} & 0 & 0 \\ d_{30} & d_{31} & d_{32} & d33 & -d_{10} & d_{31} & -d_{32} & d_{33} \end{bmatrix} \quad \text{[Equation 12]}$$

-continued $$PF = \begin{bmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{bmatrix}$$ [Equation 13]

Here, $$a = \frac{1}{2}, b = \sqrt{\frac{2}{5}}, c = \sqrt{\frac{1}{10}}, d = \frac{1}{2\sqrt{2}},$$

$$e = \frac{12}{17\sqrt{2}}, f = \frac{10}{17\sqrt{2}}, g = \frac{6}{17\sqrt{2}},$$

$$h = \frac{3}{17\sqrt{2}}, i = \frac{1}{\sqrt{5}}, j = \frac{1}{2\sqrt{5}},$$

and $$d_{00} = 4da, \; d_{10} = \frac{b}{2a}(ea + fa + ga + ha),$$

$$d_{11} = eb + fc - gc - hb,$$

$$d_{12} = \frac{2a}{b}(ea - fa - ga + ha),$$

$$d_{13} = ec - fb + gb - hc, \; d_{21} = \frac{b}{2a}(2ib - 2jc),$$

$$d_{30} = \frac{2a}{b}(fa - ha - ea - ga), \; d_{31} = (fb - hc + ec + gb),$$

$$d_{32} = \frac{2a}{b}(fa + ha + ea - ga), \; d_{33} = (fc + hb - eb + gc)$$

The multiplication of the other matrices L2·I1·R2, excluding the post scaling factor PF separated in Equation 10, is integrized and transformed into an N×N integer DCT coefficient block (step 10).

In order to transform the multiplication of the other matrices L2·I1·R2 into an N×N integer DCT coefficient block, elements of matrices L2 and R2, excluding the inputted 2N×2N integer DCT coefficient block I1, should be respectively integrized. Matrices L2 and R2 are transformed into matrices L3 and R3 of elements having the closest integer values by multiplying respective elements by 2 as many times as the number of bits of a given bit accuracy.

As an example, if an accuracy of 8 bits is provided, L3 and R3 are as shown in Equations 14 and 15.

$$L3 = \begin{bmatrix} 181 & 0 & 0 & 0 & 181 & 0 & 0 & 0 \\ 261 & 74 & -8 & 3 & -261 & 74 & 8 & 3 \\ 0 & 114 & 0 & 0 & 0 & -114 & 0 & 0 \\ -93 & 138 & 160 & -7 & 93 & 138 & -160 & -7 \end{bmatrix}$$ [Equation 14]

$$R3 = \begin{bmatrix} 181 & 0 & 0 & 0 & 181 & 0 & 0 & 0 \\ 261 & 74 & -8 & 3 & -261 & 74 & 8 & 3 \\ 0 & 114 & 0 & 0 & 0 & -114 & 0 & 0 \\ -93 & 138 & 160 & -7 & 93 & 138 & -160 & -7 \end{bmatrix}$$ [Equation 15]

As shown in mathematical 16, the created matrices L3 and R3 are respectively expressed as a matrix multiplication at the left and right sides of the inputted 2N×2N integer DCT coefficient block I1, and since all the elements of matrices L3, I1, and R3 are configures as an integer, the down-sampled N×N approximation DCT coefficient block Y1 is expressed as a multiplication of an N×N integer DCT coefficient block O3 and the post scaling factor PF.

$$Y1 = (L3 \cdot I1 \cdot R3) \otimes PF,$$

$$Y1 = O3 \otimes PF$$ [Equation 16]

That is, the inputted 2N×2N integer DCT coefficient block I1 is multiplied by matrix L3 on the left side and by matrix R3 on the right side and down-sampled to the N×N integer DCT coefficient block O3, and therefore, the size of an image can be reduced through an integer DCT operation.

Preferably, the down-sampled N×N integer DCT coefficient block O3 is divided by 2 as many times as the number of bits of the bit accuracy that is multiplied to integerize the elements of matrices L2 and R2, so that values can be adjusted to an N×N integer DCT coefficient block O4 having the closest integer values (step 11).

Hereinafter, a method of enlarging the size of an image according to an embodiment of the present invention will be described in further detail with reference to the accompanying drawings.

Figure 7:
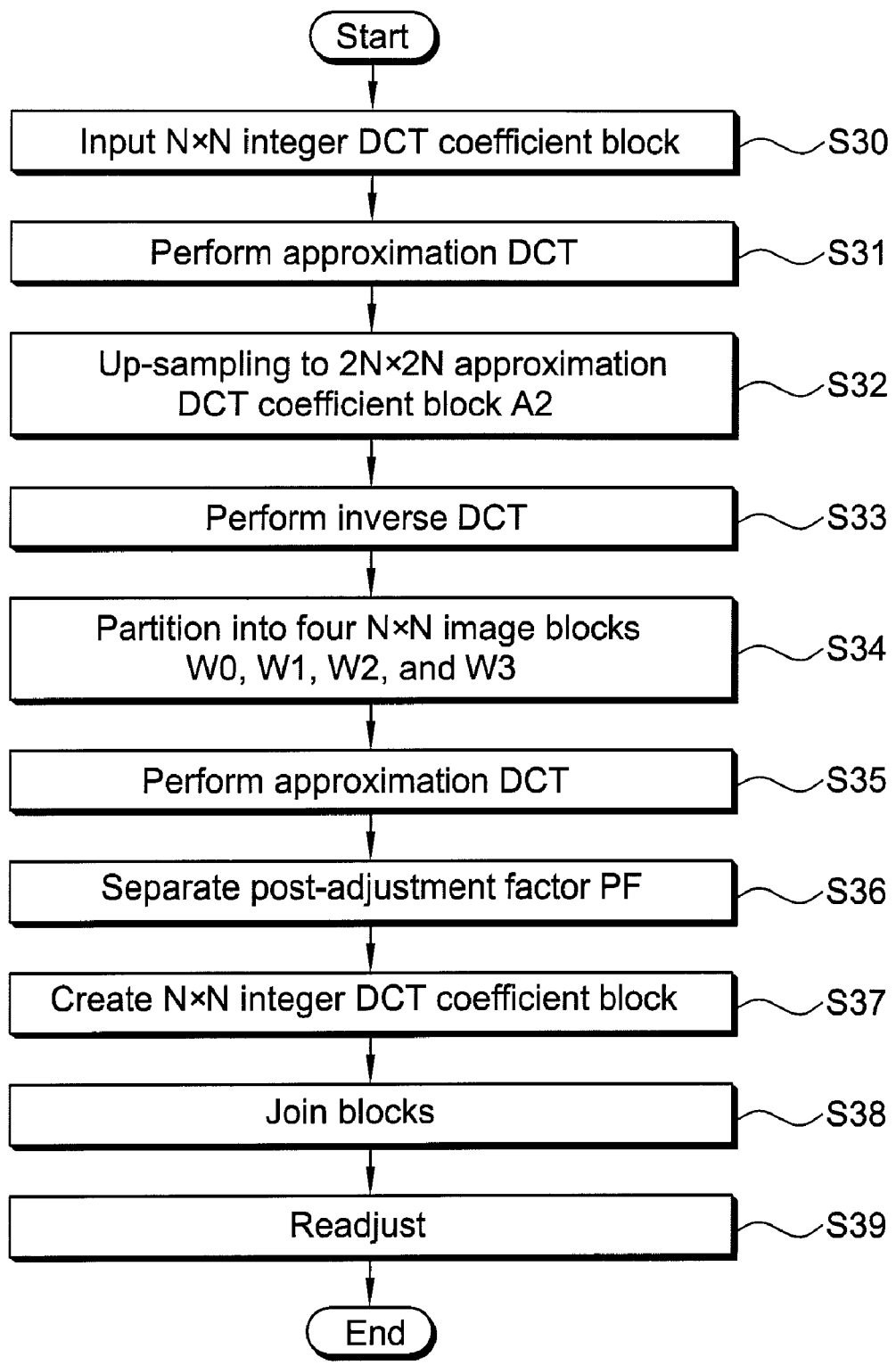
FIG. 7 is a flowchart illustrating a method of enlarging the size of an image according to an embodiment of the present invention.

Referring to FIG. 7, one N×N integer DCT coefficient block I2 is inputted (step 30), and an N×N approximation DCT coefficient block A1 is created by element-by-element multiplying the inputted N×N integer DCT coefficient block I2 and the post scaling factor PF of the N×N integer DCT coefficient block I2 (step 31). As an example of the post scaling factor, a PF multiplied to a 4×4 integer DCT coefficient block of H.264/AVC is as shown in Equation 17.

$$PF = \begin{bmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{bmatrix}$$ [Equation 17]

Here, $$a = \frac{1}{2}, b = \sqrt{\frac{2}{5}}.$$

Figure 8:
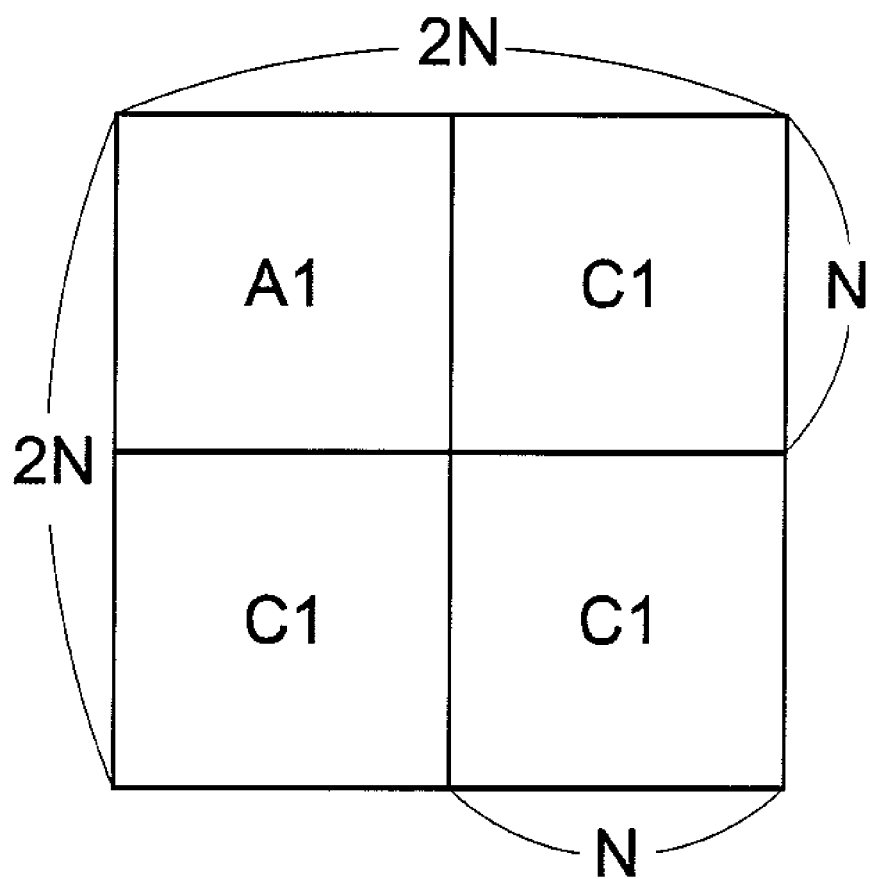
FIG. 8 is a view showing an example of a 2N×2N approximation DCT coefficient block created by inserting 0's.

The created N×N approximation DCT coefficient block A1 is up-sampled to a 2N×2N approximation DCT coefficient block A2 by inserting 0's (step 32). Referring to FIG. 8, the 2N×2N approximation DCT coefficient block A2 is created by positioning the created N×N approximation DCT coefficient block A1 at the upper left side and inserting an N×N image block C1 having elements of all 0's in the other portions of the 2N×2N approximation DCT coefficient block A2.

The up-sampled 2N×2N approximation DCT coefficient block A2 is approximation-inverse-DCT-transformed to a 2N×2N image block A3 of the space domain (step 33).

The 2N×2N image block A3 of the spatial domain is created as shown in Equation 18.

$$A3 = (T_{2N \times 2N}{}^{DA})^t \cdot A2 \cdot T_{2N \times 2N}{}^{DA}$$ [Equation 18]

As an example, 8×8 approximation DCT of H.264/AVC is as shown in Equation 19.

$$T_{8\times 8}^{DA} = \begin{bmatrix} a & a & a & a & a & a & a & a \\ b & d & e & g & -g & -e & -d & -b \\ c & f & -f & -c & -c & -f & f & c \\ d & -g & -b & -e & e & b & g & -d \\ a & -a & -a & a & a & -a & -a & a \\ e & -b & g & d & -d & -g & b & -e \\ f & -c & c & -f & -f & c & -c & f \\ g & -e & d & -b & b & -d & e & -g \end{bmatrix}$$ [Equation 19]

Here, $$a = \frac{1}{2\sqrt{2}}, b = \frac{12}{17\sqrt{2}}, c = \frac{1}{\sqrt{5}}, d = \frac{10}{17\sqrt{2}},$$

$$e = \frac{6}{17\sqrt{2}}, f = \sqrt{\frac{1}{20}}, g = \frac{3}{17\sqrt{2}}$$

Figure 9:
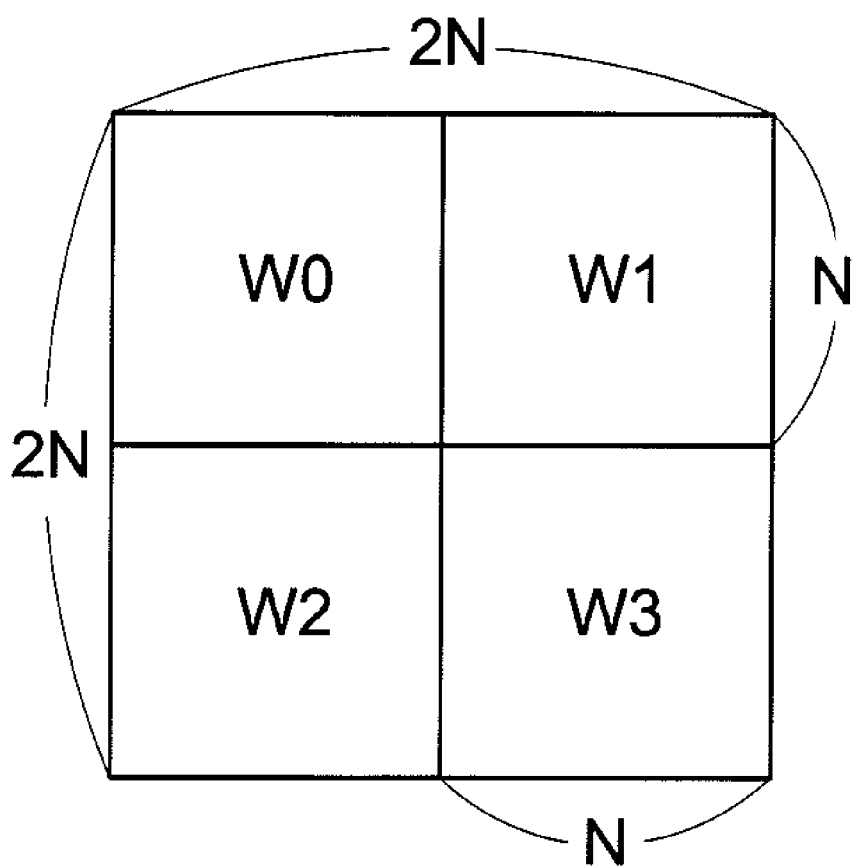
FIG. 9 is a view showing an example of four N×N image blocks configuring a inverse-DCT-transformed 2N×2N image block of the space domain.

The inverse-DCT-transformed 2N×2N image block A3 of the spatial domain is partitioned into four N×N image blocks W0, W1, W2, and W3 (step 34). Referring to FIG. 9, the four N×N image blocks forming the inverse-DCT-transformed 2N×2N image block A3 of the spatial domain includes an N×N image block W0 positioned at the upper left side, an N×N image block W1 positioned at the upper right side, an N×N image block W2 positioned at the lower left side, and an N×N image block W0 positioned at the lower right side.

The partitioned four N×N image blocks W0, W1, W2, and W3 are respectively approximation-DCT-transformed to create four N×N approximation DCT coefficient blocks V0, V1, V2, and V3 (step 35). The four N×N approximation DCT coefficient blocks V0, V1, V2, and V3 are respectively created as shown in Equation 20.

$V0 = T_{N\times N}^{DA} \cdot W0 \cdot (T_{N\times N}^{DA})^t$ $V1 = T_{N\times N}^{DA} \cdot W1 \cdot (T_{N\times N}^{DA})^t$ $V2 = T_{N\times N}^{DA} \cdot W2 \cdot (T_{N\times N}^{DA})^t$ $V3 = T_{N\times N}^{DA} \cdot W3 \cdot (T_{N\times N}^{DA})^t$ [Equation 20]

As an example, if N=4, 4×4 approximation DCT of H.264/AVC is as shown in Equation 21.

$$T_{4\times 4}^{DA} = \begin{bmatrix} a & a & a & a \\ b & c & -c & -b \\ a & -a & -a & a \\ c & -b & b & -c \end{bmatrix}$$ [Equation 21]

Here, $$a = \frac{1}{2}, b = \sqrt{\frac{2}{5}}, c = \sqrt{\frac{1}{10}}.$$

Post scaling factors PFs of respective N×N approximation DCT coefficient blocks V0, V1, V2, and V3 are separated from the created four N×N approximation DCT coefficient blocks V0, V1, V2, and V3 (step 36).

Figure 10:
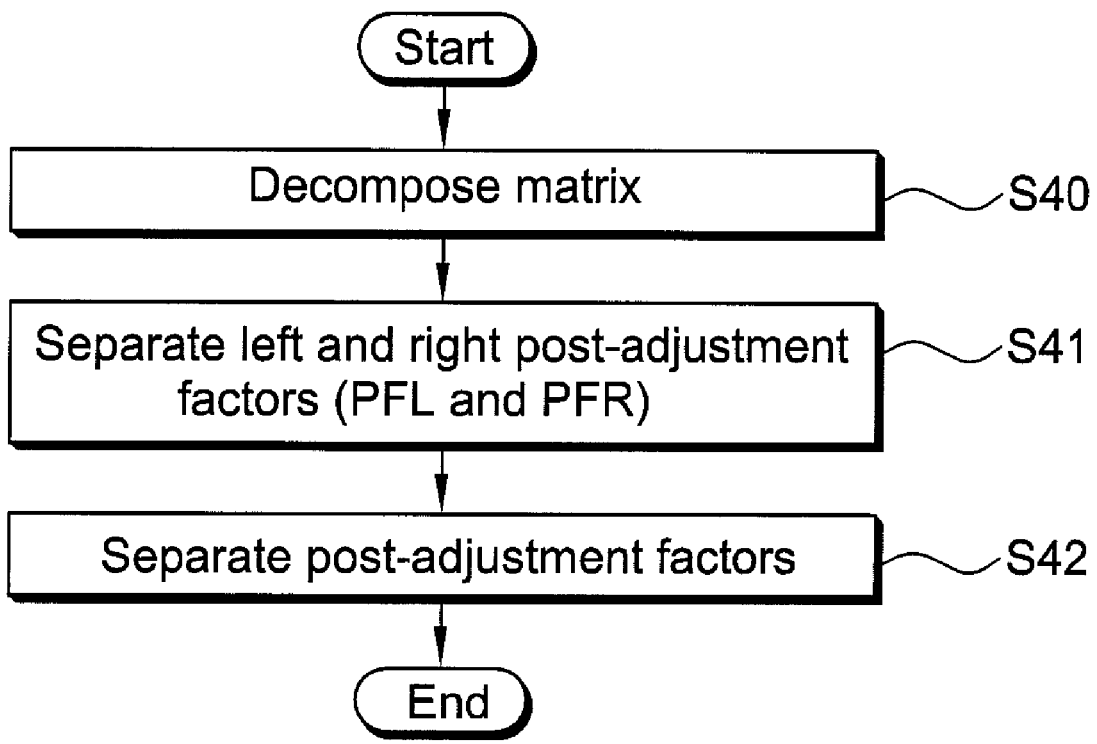
FIG. 10 is a flowchart further specifically illustrating the step of separating a post scaling factor.

FIG. 10 is a flowchart illustrating step 36 in further detail.

Referring to FIG. 10, as shown in Equation 22, the N×N approximation DCT coefficient blocks V0, V1, V2, and V3 are respectively matrix-decomposed in the form of a multiplication of the N×N approximation DCT coefficient block A1, a matrix K0 multiplied to the left side of the N×N approximation DCT coefficient block A1, and a matrix E0 multiplied to the right side of the N×N approximation DCT coefficient block A1, in the form of a multiplication of the N×N approximation DCT coefficient block A1, a matrix K1 multiplied to the left side of the N×N approximation DCT coefficient block A1, and a matrix E1 multiplied to the right side of the N×N approximation DCT coefficient block A1, in the form of a multiplication of the N×N approximation DCT coefficient block A1, a matrix K2 multiplied to the left side of the N×N approximation DCT coefficient block A1, and a matrix E2 multiplied to the right side of the N×N approximation DCT coefficient block A1, and in the form of a multiplication of the N×N approximation DCT coefficient block A1, a matrix K3 multiplied to the left side of the N×N approximation DCT coefficient block A1, and a matrix E3 multiplied to the right side of the N×N approximation DCT coefficient block A1.

$V0 = K0 \cdot A1 \cdot E0$ $V1 = K1 \cdot A1 \cdot E1$ $V2 = K2 \cdot A1 \cdot E2$ $V3 = K3 \cdot A1 \cdot E2$ [Equation 22]

As shown in Equation 23, the N×N approximation DCT coefficient block A1 is decomposed once more in the form of a multiplication of the inputted N×N integer DCT coefficient block I2, a left side post scaling factor matrix PFL multiplied to the left side of the N×N integer DCT coefficient block I2, and a right side post scaling factor matrix PFR multiplied to the right side of the N×N integer DCT coefficient block I2 (step 21).

$A1 = PFL \cdot I2 \cdot PFR$ [Equation 23]

The post scaling factors PFs of the N×N approximation DCT coefficient blocks V0, V1, V2, and V3 are decomposed by putting the N×N approximation DCT coefficient block A1 decomposed in Equation 23 into the N×N approximation DCT coefficient blocks V0, V1, V2, and V3 decomposed in Equation 22, respectively (step 42).

The step of separating the post scaling factors PFs of the N×N approximation DCT coefficient blocks V0, V1, V2, and V3 is as described below.

As shown in Equation 24, integrated matrices K00, K11, K22, and K33 are created by respectively multiplying matrices K0, K1, K2, and K3 and the left side matrix PFL, and integrated matrix E00, E11, E22, and E33 are created by respectively multiplying the right side matrix PFR and matrices E0, E1, E2, and E3.

$V0 = K00 \cdot I2 \cdot E00$ $V1 = K11 \cdot I2 \cdot E11$ $V2 = K22 \cdot I2 \cdot E22$ $V3 = K33 \cdot I2 \cdot E33$ [Equation 24]

As shown in Equation 25, matrices K00, K11, K22, and K33 are respectively decomposed into a multiplication of the left side post scaling factor matrix PFL and a matrix K000, K111, K222, or K333 in the form of multiplying the left side post scaling factor matrix PFL to the left side of the matrix K000, K111, K222, or K333, and matrices E00, E11, E22, and E33 are respectively decomposed into a multiplication of the right side post scaling factor matrix PFR and a matrix E000, E111, E222, or E333 in the form of multiplying the right side post scaling factor matrix PFR to the right side of the matrix E000, E111, E222, or E333.

$V0 = PFL \cdot K000 \cdot I2 \cdot E000 \cdot PFR$ $V1 = PFL \cdot K111 \cdot I2 \cdot E111 \cdot PFR$ $V2 = PFL \cdot K222 \cdot I2 \cdot E222 \cdot PFR$ $V3 = PFL \cdot K333 \cdot I2 \cdot E333 \cdot PFR$  [Equation 25]

As shown in Equation 26, the post scaling factors PFs are separated from the N×N approximation DCT coefficient blocks V0, V1, V2, and V3, and the separated post scaling factors PFs and the other matrices are decomposed as element-by-element multiplications.

$V0 = (K000 \cdot I2 \cdot E000) \otimes PF$ $V1 = (K111 \cdot I2 \cdot E111) \otimes PF$ $V2 = (K222 \cdot I2 \cdot E222) \otimes PF$ $V3 = (K333 \cdot I2 \cdot E333) \otimes PF$  [Equation 26]

In the case of integer DCT, examples of matrices K000, K111, K222, K333, E000, E111, E222, and E333 and the post scaling factor PF are as shown in Equation 27 to 35.

$$K000 = \begin{bmatrix} U_{00} & U_{01} & 0 & U_{03} \\ 0 & U_{11} & U_{12} & U_{13} \\ 0 & U_{21} & 0 & U_{23} \\ 0 & U_{31} & 0 & U_{33} \end{bmatrix}$$ [Equation 27]

$$K111 = \begin{bmatrix} U_{00} & -U_{01} & 0 & -U_{03} \\ 0 & U_{11} & -U_{12} & U_{13} \\ 0 & -U_{21} & 0 & -U_{23} \\ 0 & U_{31} & 0 & U_{33} \end{bmatrix}$$ [Equation 28]

$$K222 = \begin{bmatrix} U_{00} & U_{01} & 0 & U_{03} \\ 0 & U_{11} & U_{12} & U_{13} \\ 0 & U_{21} & 0 & U_{23} \\ 0 & U_{31} & 0 & U_{33} \end{bmatrix}$$ [Equation 29]

$$K333 = \begin{bmatrix} U_{00} & -U_{01} & 0 & -U_{03} \\ 0 & U_{11} & -U_{12} & U_{13} \\ 0 & -U_{21} & 0 & -U_{23} \\ 0 & U_{31} & 0 & U_{33} \end{bmatrix}^t$$ [Equation 30]

$$E000 = \begin{bmatrix} U_{00} & U_{01} & 0 & U_{03} \\ 0 & U_{11} & U_{12} & U_{13} \\ 0 & U_{21} & 0 & U_{23} \\ 0 & U_{31} & 0 & U_{33} \end{bmatrix}^t$$ [Equation 31]

$$E111 = \begin{bmatrix} U_{00} & -U_{01} & 0 & -U_{03} \\ 0 & U_{11} & -U_{12} & U_{13} \\ 0 & -U_{21} & 0 & -U_{23} \\ 0 & U_{31} & 0 & U_{33} \end{bmatrix}^t$$ [Equation 32]

$$E222 = \begin{bmatrix} U_{00} & U_{01} & 0 & U_{03} \\ 0 & U_{11} & U_{12} & U_{13} \\ 0 & U_{21} & 0 & U_{23} \\ 0 & U_{31} & 0 & U_{33} \end{bmatrix}^t$$ [Equation 33]

$$E333 = \begin{bmatrix} U_{00} & -U_{01} & 0 & -U_{03} \\ 0 & U_{11} & -U_{12} & U_{13} \\ 0 & -U_{21} & 0 & -U_{23} \\ 0 & U_{31} & 0 & U_{33} \end{bmatrix}^t$$ [Equation 34]

$$PF = \begin{bmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{bmatrix}$$ [Equation 35]

Here, $a = \frac{1}{2}, b = \sqrt{\frac{2}{5}}, c = \sqrt{\frac{1}{10}}, d = \frac{1}{2\sqrt{2}},$ $e = \frac{12}{17\sqrt{2}}, f = \frac{10}{17\sqrt{2}}, g = \frac{6}{17\sqrt{2}},$ $h = \frac{3}{17\sqrt{2}}, i = \frac{1}{\sqrt{5}}, j = \frac{1}{2\sqrt{5}},$ and $U_{00} = 4da, U_{01} = \frac{b}{2a}(ea + fa + ga + ha),$ $U_{03} = \frac{b}{2a}(fa - ha - ea - ga), U_{11} = eb + fc - gc - hb,$ $U_{13} = fb - hc + ec - gb, U_{21} = \frac{b}{2a}(ea - fa - ga + ha),$ $U_{23} = \frac{b}{2a}(fa + ha - ea - ga),$ $U_{31} = ex - fb + gb - hc, U_{33} = fc + hb - eb + gc$ Multiplications of the other matrices K000·I2·E000, K111·I2·E111, K222·I2·E222, and K333·I2·E333, excluding the post scaling factors PFs separated in Equation 26 after elements of matrices K000, K111, K222, K333, E000, E111, E222, and E333 are integerized, are integrized and transformed into four N×N integer DCT coefficient blocks U0, U1, U2, and U3 (step 37).

In order to transform the multiplications of the other matrices K000·I2·E000, K111·I2·E111, K222·I2·E222, and K333·I2·E333 into N×N integer DCT coefficient blocks, elements of matrices K000, K111, K222, K333, E000, E111, E222, and E333, excluding the inputted N×N integer DCT coefficient block I2, should be respectively integerized. Matrices K000, K111, K222, K333, E000, E111, E222, and E333 are transformed into matrices K0000, K1111, K2223, K3334, E0000, E1111, E2222, and E3333 of elements having the closest integer values by multiplying respective elements by 2 as many times as the number of bits of a given bit accuracy.

Examples of matrices K0000, K1111, K2223, K3334, E0000, E1111, E2222, and E3333 having an accuracy of 8 bits are as shown in Equations 36 to 43.

$$K0000 = \begin{bmatrix} 181 & 104 & 0 & -37 \\ 0 & 74 & 286 & 138 \\ 0 & -3 & 0 & 64 \\ 0 & 3 & 0 & -7 \end{bmatrix}$$ [Equation 36]

$$K1111 = \begin{bmatrix} 181 & -104 & 0 & 37 \\ 0 & 74 & -286 & 138 \\ 0 & 3 & 0 & -64 \\ 0 & 3 & 0 & -7 \end{bmatrix}$$ [Equation 37]

-continued $$K2222 = \begin{bmatrix} 181 & 104 & 0 & -37 \\ 0 & 74 & 286 & 138 \\ 0 & -3 & 0 & 64 \\ 0 & 3 & 0 & -7 \end{bmatrix}$$ [Equation 38]

$$K3333 = \begin{bmatrix} 181 & -104 & 0 & 37 \\ 0 & 74 & -286 & 138 \\ 0 & 3 & 0 & -64 \\ 0 & 3 & 0 & -7 \end{bmatrix}^t$$ [Equation 39]

$$E0000 = \begin{bmatrix} 181 & 104 & 0 & -37 \\ 0 & 74 & 286 & 138 \\ 0 & -3 & 0 & 64 \\ 0 & 3 & 0 & -7 \end{bmatrix}$$ [Equation 40]

$$E1111 = \begin{bmatrix} 181 & -104 & 0 & 37 \\ 0 & 74 & -286 & 138 \\ 0 & 3 & 0 & -64 \\ 0 & 3 & 0 & -7 \end{bmatrix}^t$$ [Equation 41]

$$E2222 = \begin{bmatrix} 181 & 104 & 0 & -37 \\ 0 & 74 & 286 & 138 \\ 0 & -3 & 0 & 64 \\ 0 & 3 & 0 & -7 \end{bmatrix}$$ [Equation 42]

$$E3333 = \begin{bmatrix} 181 & -104 & 0 & 37 \\ 0 & 74 & -286 & 138 \\ 0 & 3 & 0 & -64 \\ 0 & 3 & 0 & -7 \end{bmatrix}$$ [Equation 43]

Figure 11:
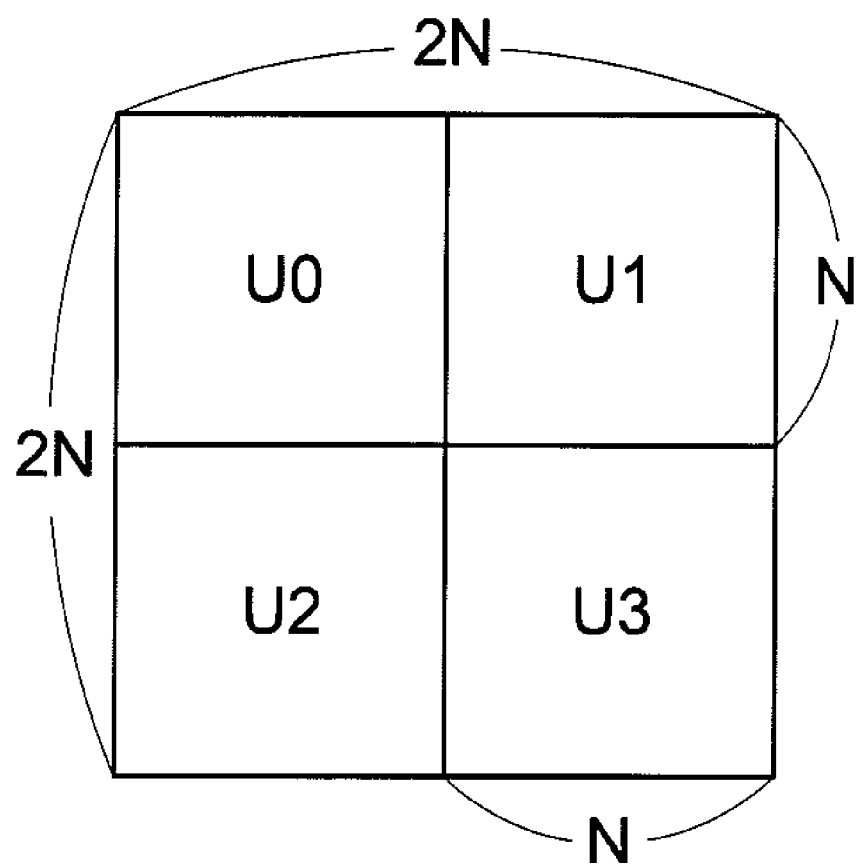
FIG. 11 is a view showing an example of a 2N×2N integer DCT coefficient block created by summing four N×N integer DCT coefficient blocks.

The transformed four N×N integer DCT coefficient blocks U0, U1, U2, and U3 are summed to create a 2N×2N integer DCT coefficient block T3 (step 38). Referring to FIG. 11, the 2N×2N integer DCT coefficient block T3 is created by positioning an N×N integer DCT coefficient block U0 at the upper left side, an N×N integer DCT coefficient block U1 at the upper right side, an N×N integer DCT coefficient block U2 at the lower left side, and an N×N integer DCT coefficient block U3 at the lower right side.

Accordingly, the inputted N×N integer DCT coefficient block I2 is up-sampled to the 2N×2N integer DCT coefficient block T3 through steps 30 to 38 described above, and therefore, the size of an image can be enlarged through an integer DCT operation.

Preferably, the up-sampled 2N×2N integer DCT coefficient block T3 is divided by 2 as many times as the number of bits of the bit accuracy that is multiplied to integerize the elements of matrices K000, K111, K222, K333, E000, E111, E222, and E333, so that the size can be adjusted to a 2N×2N integer DCT coefficient block T4 having the closest integer values (step 39).

On the other hand, the embodiments of the present invention described above can be programmed as a program executable in a computer and implemented in a general-purpose digital computer that operates the program using a computer-readable recoding medium.

The computer-readable recoding medium includes storage media such as magnetic storage media (e.g., ROM, floppy disk, and hard disk), optical reading media (e.g., CD-ROM, and DVD), and carrier waves (e.g., transmission through the Internet).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Since the method of reducing and enlarging the size of an image according to the present invention reduces or enlarges the size of an image through an integer operation, hardware can be implemented using shifts and additions. Therefore, complexity of the hardware may be lowered, and the method of the present invention provides images of a good quality that is almost the same as the quality of an image provided according to a conventional method of reducing and enlarging an image using real-number DCT coefficients.

Furthermore, since the method of reducing and enlarging the size of an image according to the present invention reduces or enlarges the size of an image using integer DCT coefficients, occurrence of bit errors can be prevented when a real-number operation is transformed into an integer operation in the process of coding and decoding an image.

Furthermore, since the method of reducing and enlarging the size of an image according to the present invention reduces or enlarges the size of an image using integer DCT coefficients, the present invention is compatible with a H.264/AVC codec.

What is claimed is:

1. A method of reducing the size of an image, the method comprising the steps of:
   (a) partitioning an inputted 2N×2N integer DCT coefficient block I1 into N×N integer DCT coefficient blocks B0, B1, B2, and B3, transforming the partitioned N×N integer DCT coefficient blocks into N×N approximation-DCT-coefficient blocks C0, C1, C2 and C3 and approximation-inverse-DCT-transforming the N×N approximation-DCT-coefficient blocks C0, C1, C2 and C3 into image blocks D0, D1, D2, and D3 of a space domain;
   (b) creating 2N×2N image blocks P0, P1, P2, and P3 by inserting the respective approximation-inverse-DCT-transformed N×N image blocks D0, D1, D2, and D3 to N×N image blocks having elements of all 0's and approximation-DCT-transforming the created 2N×2N image blocks P0, P1, P2, and P3 into 2N×2N approximation DCT coefficient blocks Q0, Q1, Q2, and Q3;
   (c) creating a combined approximation coefficient block Y0 by summing the 2N×2N approximation DCT coefficient blocks Q0, Q1, Q2, and Q3 and down-sampling an N×N approximation DCT coefficient block Y1 of a low frequency component from the created combined approximation coefficient block Y0;
   (d) separating a post scaling factor PF of the down-sampled N×N approximation DCT coefficient block Y1 from the down-sampled N×N approximation DCT coefficient block Y1; and
   (e) transforming portions excluding the post scaling factor PF separated from the down-sampled N×N approximation DCT coefficient block Y1 into an N×N integer DCT coefficient block O3.

2. The method according to claim 1, wherein step (a) comprises the steps of:
   inputting the 2N×2N integer DCT coefficient block I1 comprising four adjacent N×N integer DCT coefficient blocks;
   partitioning the inputted 2N×2N integer DCT coefficient block I1 into the four N×N integer DCT coefficient blocks B0, B1, B2, and B3;
   transforming the N×N integer DCT coefficient blocks B0, B1, B2, and B3 into the approximation DCT coefficient blocks C0, C1, C2, and C3 by element-by-element multiplying the partitioned N×N integer DCT coefficient blocks B0, B1, B2, and B3 and the a post scaling factor of the partitioned N×N integer DCT coefficient blocks B0, B1, B2, and B3; and transforming the transformed approximation DCT coefficient blocks C0, C1, C2, and C3 into the N×N image blocks D0, D1, D2, and D3 of the space domain through approximation-inverse-DCT-transform.

3. The method according to claim 1, wherein step (d) comprises the steps of:
(d1) decomposing the down-sampled N×N approximation DCT coefficient block Y1 into a multiplication of the combined approximation coefficient block Y0 and a left side matrix L0 and a right side matrix R0 of the combined approximation coefficient block Y0;
(d2) decomposing the combined approximation coefficient block Y0 into a multiplication of the inputted 2N×2N integer DCT coefficient block I1 and a left side post scaling factor (PFL) and a right side post scaling factor (PFR) of the inputted 2N×2N integer DCT coefficient block I1; and
(d3) separating the post scaling factor PF of the down-sampled N×N approximation DCT coefficient block Y1 by putting the decomposed combined approximation coefficient block Y0 into the decomposed down-sampled N×N approximation DCT coefficient block Y1.

4. The method according to claim 3, wherein the down-sampled N×N approximation DCT coefficient block Y1 is decomposed as shown in Equation 1-1 in step (d1), $$Y1 = L0 \times Y0 \times R0; \quad \text{[Equation 1-1]}$$

the combined approximation coefficient block Y0 is decomposed as shown in Equation 2-1 in step (d2), $$Y0 = PFL \times I1 \times PFR; \text{ and} \quad \text{[Equation 2-1]}$$

the post scaling factor PF of the down-sampled N×N approximation DCT coefficient block Y1 is separated as shown in Equations 3-1 to 5-1 in step (d3), $$Y1 = L0 \times PFL \times I1 \times PFR \times R0 \quad \text{[Equation 3-1]}$$

$$Y1 = PFL \times L2 \times I1 \times R2 \times PFR \quad \text{[Equation 4-1]}$$

$$Y1 = (L2 \times I1 \times R2) \otimes PF, \quad \text{[Equation 5-1]}$$

wherein L1 is a left side matrix of the inputted 2N×2N integer DCT coefficient block I1, and R1 is a right side matrix of the inputted 2N×2N integer DCT coefficient block I1.

5. The method according to claim 4, wherein in step (e), each coefficient of the left side matrix L2 and the right side matrix R2 of the inputted 2N×2N integer DCT coefficient block I1 is transformed into an integer by multiplying each coefficient of the left side matrix L2 and the right side matrix R2 of the inputted 2N×2N integer DCT coefficient block I1 by a scalable constant.

6. A method of enlarging the size of an image, the method comprising the steps of:
(a) transforming an inputted N×N integer DCT coefficient block I2 into N×N approximation DCT coefficient block A1 by element-by-element multiplying the inputted N×N integer DCT coefficient block I2 and a post scaling factor of the inputted N×N integer DCT coefficient block I2;
(b) up-sampling the N×N approximation DCT coefficient block A1 into a 2N×2N approximation DCT coefficient block A2 inserting the N×N approximation DCT coefficient block A1 to N×N image blocks having elements of all 0's and approximation-inverse-DCT-transforming the up-sampled 2N×2N approximation DCT coefficient block A2 into a 2N×2N image block A3 of a space domain;
(c) partitioning the 2N×2N image block A3 into four N×N image blocks W0, W1, W2, and W3 and creating four N×N approximation DCT coefficient blocks V0, V1, V2, and V3 by approximation-DCT-transforming the respective partitioned N×N image blocks;
(d) separating post scaling factors PFs of the four created N×N approximation DCT coefficient blocks V0, V1, V2, and V3 from the N×N approximation DCT coefficient blocks V0, V1, V2, and V3;
(e) transforming portions excluding the post scaling factors PFs separated from the four N×N approximation DCT coefficient blocks V0, V1, V2, and V3 into N×N integer DCT coefficient blocks U0, U1, U2, and U3 respectively; and
(f) transforming the transformed four N×N integer DCT coefficient blocks U0, U1, U2, and U3 into a 2N×2N integer DCT coefficient block T3 by summing the N×N integer DCT coefficient blocks U0, U1, U2, and U3.

7. The method according to claim 6, wherein step (d) comprises the steps of:
(d1) decomposing each of the created four N×N approximation DCT coefficient blocks V0, V1, V2, and V3 into a multiplication of the N×N approximation DCT coefficient block A1 and a left side matrix K0, K1, K2, or K3 and a right side matrix E0, E1, E2, or E3 of the N×N approximation DCT coefficient block A1;
(d2) decomposing the N×N approximation DCT coefficient block A1 into the inputted N×N integer DCT coefficient block I2 and a left side post scaling factor (PFL) and a right side post scaling factor (PFR) of the N×N integer DCT coefficient block I2; and
(d3) separating the post scaling factors PFs of the N×N approximation DCT coefficient blocks V0, V1, V2, and V3 by putting the decomposed N×N approximation DCT coefficient block A1 into the decomposed N×N approximation DCT coefficient blocks V0, V1, V2, and V3.

8. The method according to claim 7, wherein the four N×N approximation DCT coefficient blocks V0, V1, V2, and V3 are decomposed as shown in Equation 6-1 in step (d1), $$V0 = K0 \times A1 \times E0$$

$$V1 = K1 \times A1 \times E1$$

$$V2 = K2 \times A1 \times E2$$

$$V3 = K3 \times A1 \times E3; \quad \text{[Equation 6-1]}$$

the N×N approximation DCT coefficient block A1 is decomposed as shown in Equation 7-1 in step (d2), $$A1 = PFL \times I2 \times PFR; \text{ and} \quad \text{[Equation 7-1]}$$

the post scaling factors PFs of the N×N approximation DCT coefficient blocks V0, V1, V2, and V3 are separated as shown in Equations 8-1 to 10-1 in step (d3), $$V0 = K0 \times PFL \times I2 \times PFR \times E0$$

$$V1 = K1 \times PFL \times I2 \times PFR \times E1$$

$$V2 = K2 \times PFL \times I2 \times PFR \times E2$$

$$V3 = K3 \times PFL \times I2 \times PFR \times E3 \quad \text{[Equation 8-1]}$$

$$V0 = PFL \times K000 \times I2 \times E000 \times PFR$$

$$V1 = PFL \times K111 \times I2 \times E111 \times PFR$$

$$V2 = PFL \times K222 \times I2 \times E222 \times PFR$$

$$V3 = PFL \times K333 \times I2 \times E333 \times PFR \qquad \text{[Equation 9-1]}$$

$$V0 = (K000 \times I2 \times E000) - PF$$

$$V1 = (K111 \times I2 \times E111) - PF$$

$$V2 = (K222 \times I2 \times E222) - PF$$

$$V3 = (K333 \times I2 \times E333) - PF, \qquad \text{[Equation 10-1]}$$

wherein K000, K111, K222, and K333 are respectively left side matrices of the inputted N×N integer DCT coefficient block I2 for the four N×N approximation DCT coefficient blocks V0, V1, V2, and V3, and E000, E111, E222, and E333 are respectively right side matrices of the inputted N×N integer DCT coefficient block I2 for the four N×N approximation DCT coefficient blocks V0, V1, V2, and V3.

9. The method according to claim 8, wherein in step (e), each coefficient of the left side matrices K000, K111, K222, and K333 and the right side matrices E000, E111, E222, and E333 of the inputted N×N integer DCT coefficient block I2 is transformed into an integer by multiplying each coefficient of the left side matrices K000, K111, K222, and K333 and the right side matrices E000, E111, E222, and E333 of the inputted N×N integer DCT coefficient block I2 by a scalable constant.

* * * * *